United States Patent [19]

Swartz

[11] Patent Number: 5,736,203
[45] Date of Patent: Apr. 7, 1998

[54] JAW TYPE TRAP

[76] Inventor: Denny M. Swartz, Star Rte., Box 29, Reno, Ohio 45773

[21] Appl. No.: 598,906

[22] Filed: Feb. 9, 1996

[51] Int. Cl.[6] .................... A01M 23/26; A47G 33/10
[52] U.S. Cl. .................... 428/19; 43/88; 43/90; 428/122; 428/358
[58] Field of Search .................... 428/7, 122, 19; 43/88, 90

[56] References Cited

U.S. PATENT DOCUMENTS

| | | | |
|---|---|---|---|
| 334,311 | 1/1886 | Vasseur, Jr. | 43/93 |
| 2,645,876 | 7/1953 | Bruske | 43/96 X |
| 3,010,245 | 11/1961 | Conibear | 43/90 |
| 3,991,509 | 11/1976 | Frost | 43/90 |
| 4,000,578 | 1/1977 | Souza | 43/92 |
| 4,020,585 | 5/1977 | Benschoter | 43/96 |
| 4,802,301 | 2/1989 | Isbom | 43/58 |

*Primary Examiner*—Henry F. Epstein
*Attorney, Agent, or Firm*—Paul E. Millikor; Lee A. Germain

[57] ABSTRACT

A jaw type trap constructed from elongated bendable stock such as wires or rods. The entire body frame of the trap and the spring can be made from a single elongated piece of stock material solely formed by appropriate bending and a minimum of welded or brazed attachments. This is particularly useful as a miniature novelty trap such as a toy, Christmas ornament or item of jewelry.

21 Claims, 4 Drawing Sheets

JAW TYPE TRAP

FIELD OF INVENTION

This invention relates to jaw type traps and in particular to those constructed from elongated bendable stock such as wires or rods. This device is particularly useful as a miniature novelty trap such as a toy, Christmas ornament or item of jewelry.

BACKGROUND OF THE INVENTION

Jaw type steel traps have been known for many years for trapping animals. A typical example of such trap is shown in U.S. Pat. No. 334,311 issued to J. Vasseur, Jr. on Jan. 12, 1886. This type of trap was made of stamped steel and many variations of this type trap are shown in other issued patents. One such patent is U.S. Pat. No. 2,645,876 issued to W. J. Bruske on Jul. 21, 1953 which is directed to a specific trigger mechanism with a delayed-action guard.

It is also known to construct traps of wire or rod stock such as that shown in U.S. Pat. No. 3,991,509 issued to J. E. Frost on Nov. 16, 1976. The Frost patent describes a swing-frame animal trap in which the arrangement and operation of the working parts differ substantially from the jaw type trap.

OBJECTS OF THE INVENTION

An object of the present invention is to provide a simple jaw type trap which can be easily manufactured from elongated bendable stock material such as wires or rods with the main body frame of the trap being formed from one continuous piece of material.

Another object of this invention is to provide a miniature novelty trap such as a toy, a Christmas ornament or an item of jewelry.

An even further object of this invention is to provide a trap which can be assembled primarily by bending the stock material and with only a minimum of mechanical or other fastening means such as welding or brazing to connect together the parts of the trap.

These and other objects of the invention will become more fully apparent in the following specification and the attached drawings:

SUMMARY OF THE INVENTION

A jaw type trap formed of a bendable elongated stock material comprising: a horizontal base frame, a pair of pair of spaced apart hinge members extending upwardly from the base frame, each hinge member forming a hinge opening which is in axial alignment with the hinge opening formed by the opposite hinge member, a pair of substantially U-shaped jaws each having one end hingedly engaging one of the hinge members and an opposite end hingedly engaging the opposite hinge member, the jaws being pivoted at the hinge members to swing from a horizontal open position to a vertical closed position with one of the jaws being latchable an the other jaw being non-latchable, a latch mechanism hingedly mounted on the base frame in a position to retain the latchable jaw in a horizontal position when the trap is set, a trigger means attached to the latch mechanism to release the latch mechanism when the trap is sprung, and a spring means attached to the base frame near one of the hinge means and having a jaw closing portion to urge the jaws into a closed position when the latch is released.

DESCRIPTION OF THE PREFERRED EMBODIMENTS

Figure 1:
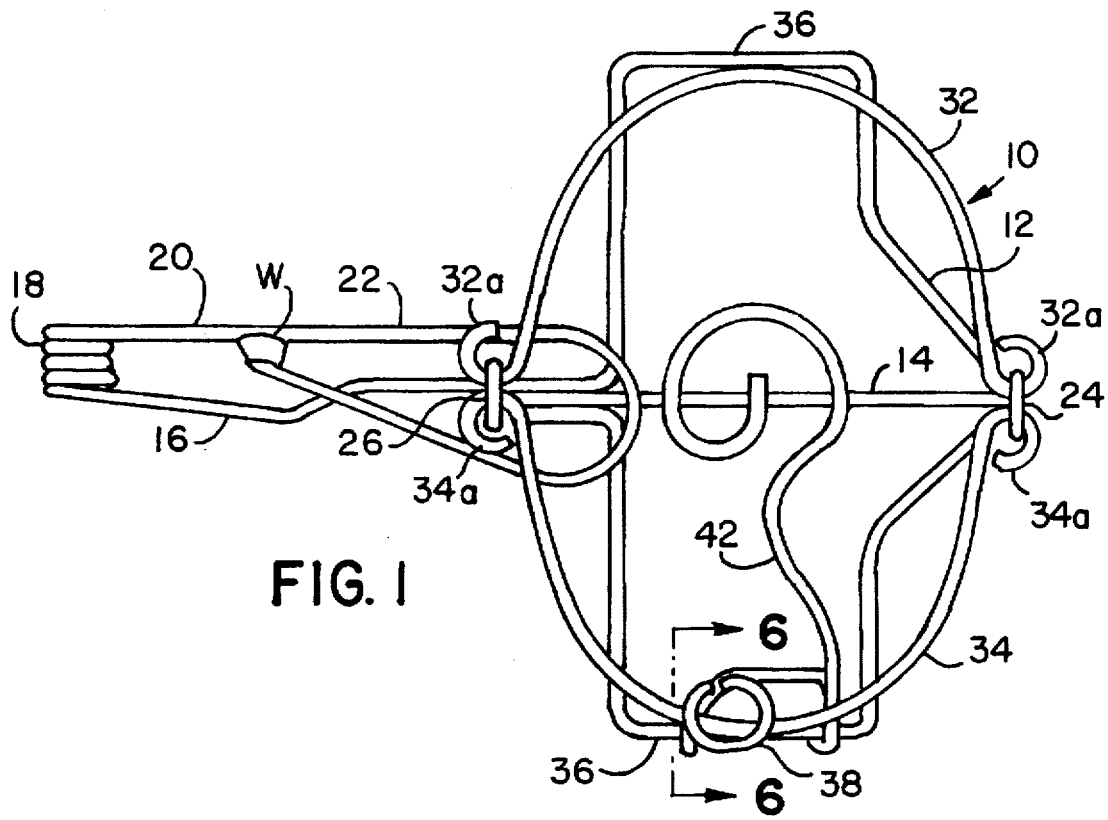
FIG. 1 is a top plan view of one embodiment of the invention showing the jaws of the trap in a horizontal set open position.
Figure 2:
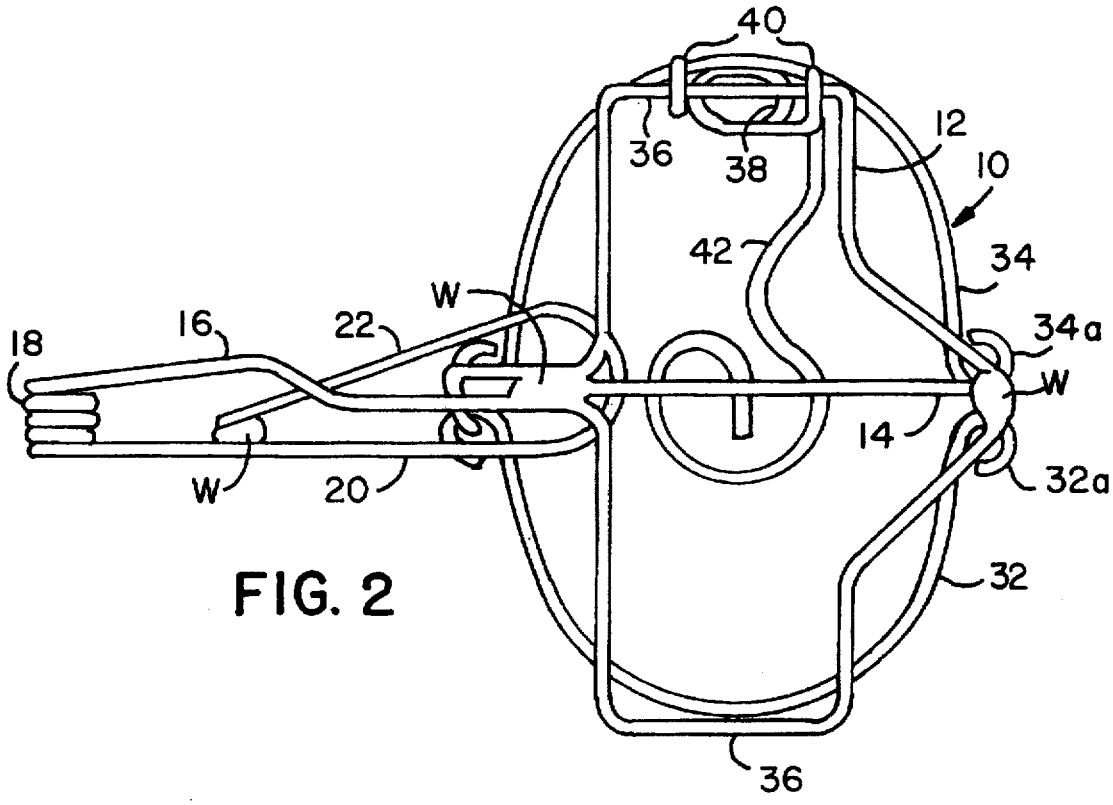
FIG. 2 is a bottom plan view the embodiment shown in FIG. 1.
Figure 3:
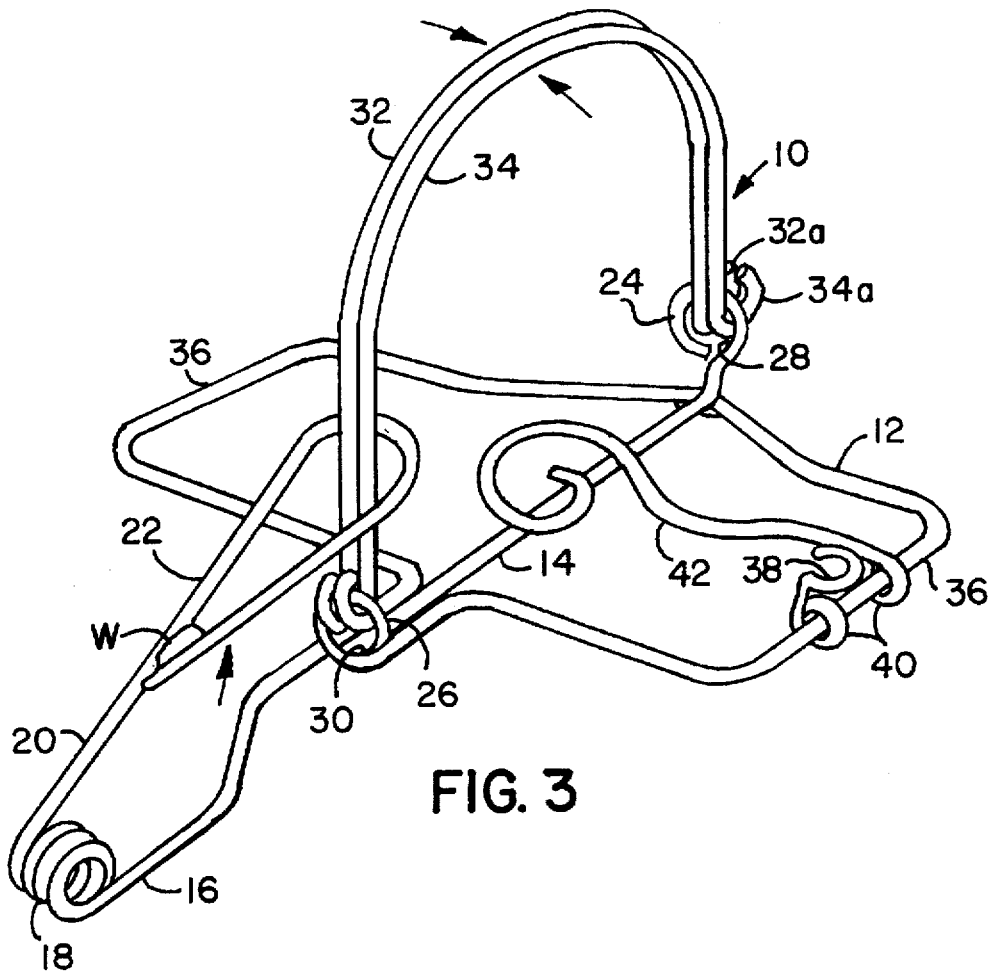
FIG. 3 is a perspective view of the embodiment shown in FIGS. 1 and 2 but with the trap sprung with the jaws closed in a vertical side by side position.
Figure 4:
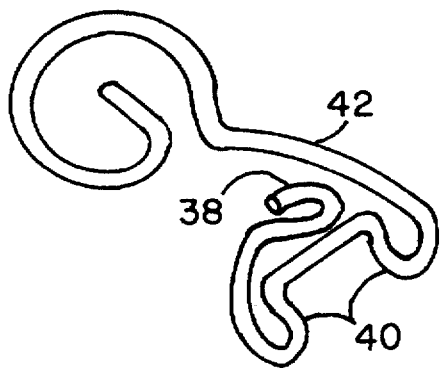
FIG. 4 is a perspective view of the jaw latch and trigger arm mechanism for the embodiment shown in FIGS. 1 through 3.

Referring now to the drawings and in particular to FIGS. 1 through 3, a jaw type trap as a whole is indicated by the numeral 10. The entire trap 10 is made of an elongated bendable stock material such as wire or metal rod which can be formed by bending but which has sufficient resilience to perform as a spring when bent or wound into a coil spring as will be explained later.

The trap 10 has a substantially rectangular horizontal base frame 12 to which is attached a longitudinal center brace 14 and a rearwardly extending spring support arm 16 formed integrally with a coil spring 18 which also carries a moveable spring arm 20 which is integral with a jaw closing loop 22 on one end thereof.

The base frame 12 has a front hinge loop 24 and a rear hinge loop 26 formed preferably integrally with the base frame 12 and extending upwardly therefrom with the hinge loops 24 and 26 respectively defining hinge openings 28 and 30 as best shown in FIG. 3. The base frame 12 and the jaw closing loop 22 has welded or brazed attachments indicated by the letter "W" in FIGS. 1 and 2 to provide greater stability to the trap.

A pair of substantially identical U-shaped jaws 32 and 34 have respectively end loops 32a and 34a on each end with both the front and rear hinge openings 28 and 30 each receiving a pair of adjacent end loops 32a and 34a of the jaws 32 and 34. There is sufficient clearance between the end loops 32a and 34a and the hinge loops 24 and 26 that the jaws 32 and 34 are both free to pivot at each end at the hinge loops 24 and 26 and are moveable from a horizontal open position when the trap 10 is set as shown in FIG. 1, to a vertical closed position when the trap is sprung as shown in FIG. 3.

The base frame 12 has a pair of laterally outer side portions 36, one of which hingedly carries a latch 38 attached by latch loops 40. A trigger arm 42 is integral with the latch 38 and latch loops 40. Downward movement of the trigger arm 42 releases the latch 38 as shown by the direction of the arrows in FIG. 6 and permits the latchable jaw 34 to be moved up into a vertical closed position along with the non-latchable jaw 32 due to upward pressure from the jaw closing loop 22.

Figure 5:
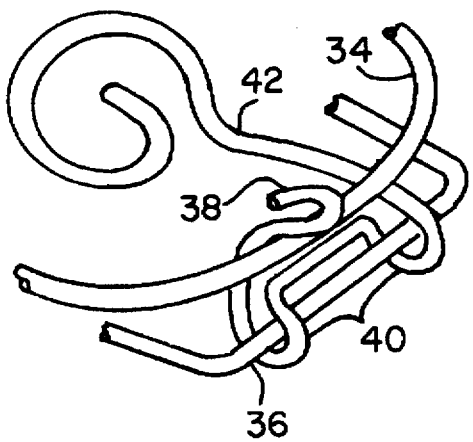
FIG. 5 is a fragmentary perspective view of the jaw latch and trigger arm mechanism of the jaw latch and trigger arm mechanism shown in FIG. 4 in a mounted position on the base frame of the trap and in a latched position retaining a jaw in an open set position as shown in FIGS. 1 and 2.
Figure 6:
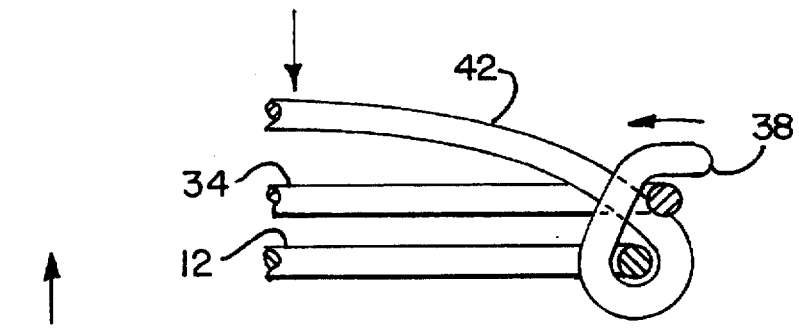
FIG. 6 is a fragmentary cross sectional view of the latch and trigger mechanism taken on line 6—6 of FIG. 1 showing the latch retaining a jaw in an open set position.

In operation the trap 10 is set by holding down the latchable jaw 34 in a horizontal open position and moving the latch 38 into a latched position as shown in FIGS. 1 and 2 as well as FIGS. 5 and 6. Latching the jaw 34 in the horizontal position holds down the jaw closing loop 22 and also permits the non-latchable jaw 32 to fall into a horizontal position as shown in FIG. 1. Downward pressure on the trigger arm 42 will move the latch 38 in the direction shown by the arrows in FIG. 6 and release the jaw 34 thereby permitting the jaw closing loop 22 to be moved rapidly upwardly by the spring 18 and thereby cause both the jaws 32 and 34 to snap into the vertical closed position shown in FIG. 3.

Figure 7:
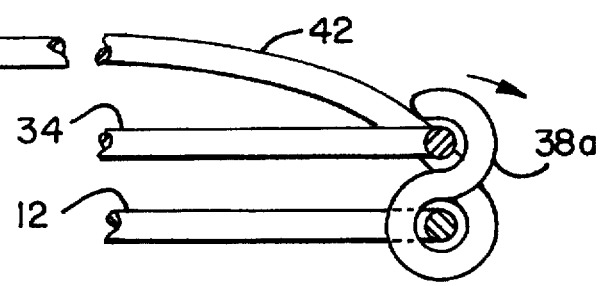
FIG. 7 is a fragmentary cross sectional view similar to FIG. 6 except that the direction of the latch is reversed so that the latch is released by pulling up on the trigger arm rather than pressing down on the trigger arm.

Another embodiment of the latch 38 is shown in FIG. 7 wherein a latch 38a is reversed in direction so that the latch 38a is released by pulling up on the trigger arm 42 instead of depressing the trigger arm.

Figure 8:
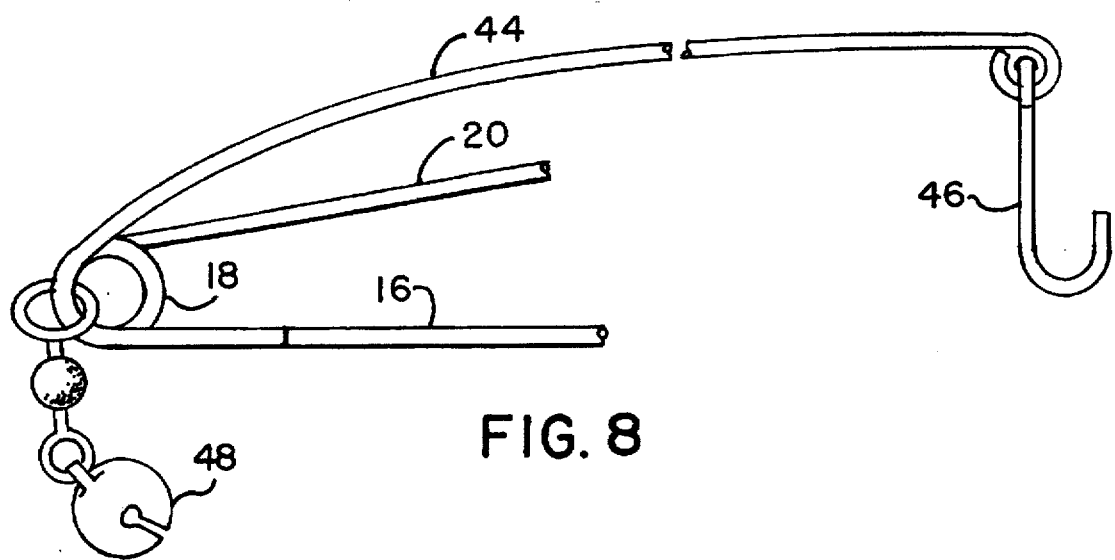
FIG. 8 is a fragmentary side elevational view showing a hook attached to the trap of the invention for hanging up the trap as a Christmas ornament.

As previously mentioned, the trap of this invention is particularly suited to use as a miniature novelty device such as a toy or Christmas ornament. FIG. 8 shows how an arm 44 carrying a hook 46 can be attached to the trap at any convenient location such as the spring support arm 16 near the coil spring 18. In addition an item such as the bell 48 can be attached to the coil spring 18 or at any other suitable location.

Figure 9:
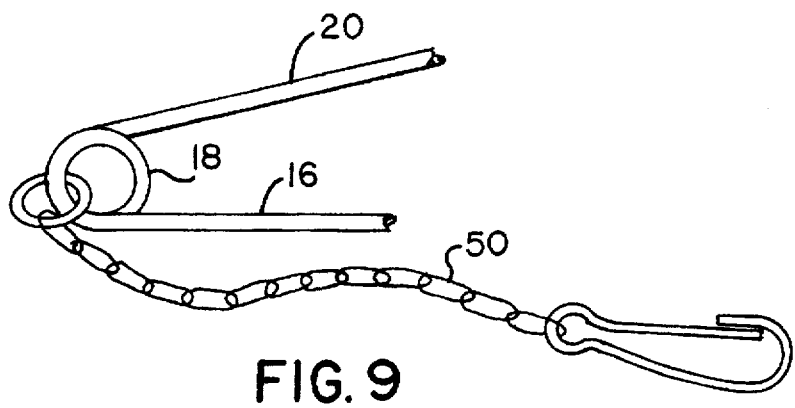
FIG. 9 is a fragmentary side elevation view showing a key chain attached to the trap of the invention.

In FIG. 9 a key chain 50 is shown attached to the coil spring 18 as another novelty variation.

It should be recognized that this novelty trap could be fitted with a pin and worn pinned to clothing or worn on a necklace or used in many other creative ways.

Figure 10:
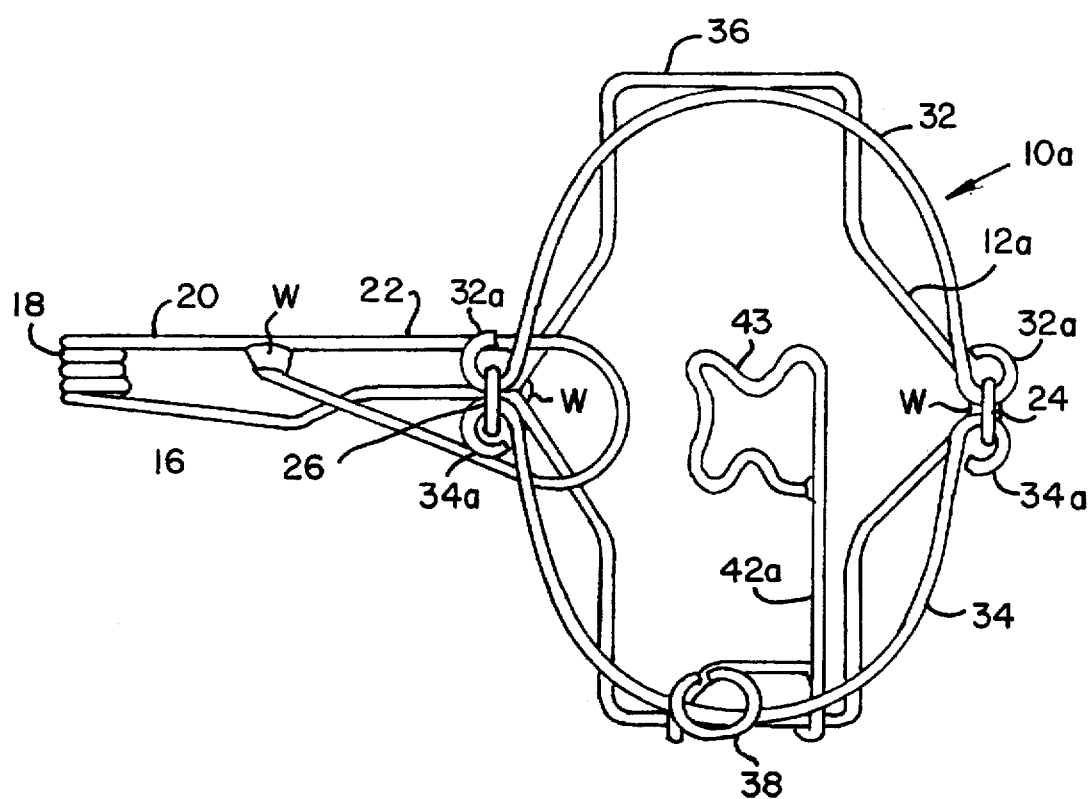
FIG. 10 is a top elevational view of another modification of the invention similar to FIG. 1, but having an open base frame without a center brace.

The embodiment of FIG. 10 is similar to that of FIG. 1 except the base frame 12a is different in shape than the frame 12 in FIG. 1 and does not have a center brace 14. The trigger arm 42a has a different end pad 43 from the spiral end of the trigger arm 42 in FIG. 1.

In can be understood from the drawings that except for the jaws 32 and 34 and the latch 38 and trigger arm 42, all the rest of the trap 10 can be made from one continuous wire or rod by making the necessary bends and by welding or brazing at a few key locations as previously mentioned such as the end of the jaw closing loop 22 and the ends of the center brace 14. Each of the jaws 32 and 34 can be formed from a single piece and the entire assembly of the latch 38 and trigger arm 42 can be formed from a single piece of material without any welds or other fastener means.

The size of the traps shown in the drawings are not necessarily representative of actual size of the traps made in accordance with the invention and while the actual traps may in some instances be larger than the drawings, they will often be made smaller than the size of the patent drawings.

The variations shown described herein and many other variations can be made in the invention without departing from the scope of the invention.

I claim:

1. A jaw type trap comprising:

a horizontal base frame extending laterally of the trap from each side of a longitudinally extending center line of the trap and having laterally outer frame portions spaced from the center line of the trap on each side thereof and at least two spaced apart lateral frame portions extending between the laterally outer frame portions;

a hinge loop attached to each lateral frame portion near the center line of the trap and extending upwardly therefrom, each loop forming a hinge opening which is in axial alignment with the hinge opening formed by the opposite loop;

a pair of substantially U-shaped jaws each having one end hingedly engaging one of the hinge loops and an opposite end hingedly engaging the opposite hinge loop;

the jaws being pivoted at the hinge loops to swing from a horizontal open position to a vertical closed position with one of the jaws being latchable and the other jaw being non-latchable;

a latch mechanism hingedly mounted on one of the laterally outer frame portions to retain the latchable jaw in a horizontal position when the trap is set;

a trigger arm attached to the latch mechanism to release the latch mechanism when the trap is sprung; and a spring means attached to the base frame near the longitudinally extending center line of the trap and having a jaw closing portion to urge the jaws into a closed position when the latch is released.

2. A trap as claimed in claim 1 wherein the trap is substantially formed of bendable elongated stock material.

3. A trap as claimed in claim 2 wherein the base frame, the spring means and the hinge loops are formed of one continuous piece of elongated stock material.

4. A trap as claimed in claim 2 wherein the stock material is bendable wire.

5. A trap as claimed in claim 1 wherein each end of each jaw it bent into an end loop which passes through one of the hinge loops.

6. A trap as claimed in claim 5 wherein each hinge loop receives an adjacent end loop of both jaws.

7. A trap as claimed in claim 1 wherein the spring means has a jaw closing loop surrounding both jaws at one end thereof to urge the jaws into a vertical closed position when the trap is sprung.

8. A trap as claimed in claim 1 wherein the trap is sprung by downward pressure on the trigger arm.

9. A trap as claimed in claim 1 wherein the trap is sprung by pulling up on the trigger arm.

10. A trap as claimed in claim 1 wherein the trap is a miniature novelty item.

11. A trap as claimed in claim 10 wherein the trap is a toy.

12. A trap as claimed in claim 10 wherein the trap is a Christmas ornament which includes a hook for hanging the trap from a Christmas tree or other location.

13. A trap as claimed in claim 10 wherein the trap includes a key chain attached thereto.

14. A jaw type trap formed of a bendable elongated stock material comprising:

a horizontal base frame;

a pair of pair of spaced apart hinge members extending upwardly from the base frame, each hinge member forming a hinge opening which is in axial alignment with the hinge opening formed by the opposite hinge member;

a pair of substantially U-shaped jaws each having one end hingedly engaging one of the hinge members and an opposite end hingedly engaging the opposite hinge member;

the jaws being pivoted at the hinge members to swing from a horizontal open position to a vertical closed position with one of the jaws being latchable and the other jaw being non-latchable;

a latch mechanism hingedly mounted on the base frame in a position to retain the latchable jaw in a horizontal position when the trap is set;

a trigger means attached to the latch mechanism to release the latch mechanism when the trap is sprung; and a spring means attached to the base frame near one of the hinge means and having a jaw closing portion to urge the jaws into a closed position when the latch is released.

15. A trap as claimed in claim 14 wherein the base frame, the spring means and the hinge means are formed of one continuous piece of elongated stock material.

16. A trap as claimed in claim 15 wherein the spring means has a coil spring wound from the same continuous piece of stock material as the rest of the spring means.

17. A trap as claimed in claim 15 wherein the stock material is bendable wire.

18. A trap as claimed in claim 14 wherein each end of each jaw it bent into an end loop which passes through one of the hinge openings in one of the hinge members.

19. A trap as claimed in claim 18 wherein each hinge opening receives an adjacent end loop of both jaws.

20. A trap as claimed in claim 14 wherein the spring means has a jaw closing loop surrounding both jaws at one end thereof to urge the jaws into a vertical closed position when the trap is sprung.

21. A jaw type trap formed of a bendable wire comprising:

a horizontal base frame;

a pair of upwardly extending spaced apart hinge loops each forming a hinge opening which is in axial alignment with the hinge opening formed by the opposite hinge loop, the hinge loops being integral with the base frame;

a pair of substantially U-shaped jaws each having one end hingedly engaging one of the hinge loops and an opposite end hingedly engaging the opposite hinge loop;

the jaws being pivoted at the hinge loops to swing from a horizontal open position to a vertical closed position with at least one of the jaws being latchable;

a latch mechanism mounted on the base frame in a position to retain the latchable jaw in a horizontal position when the trap is set;

a trigger means attached to the latch mechanism to release the latch mechanism when the trap is sprung; and a spring means attached to the base frame near one of the hinge loops and having a jaw closing portion to urge the jaws into a closed position when the latch is released, the spring means being integral with the base frame.

* * * * *